US005700213A

United States Patent [19]

Simpson et al.

[11] Patent Number: 5,700,213
[45] Date of Patent: Dec. 23, 1997

[54] INTEGRAL INLET AND PRESSURE RELIEF VALVE FOR AN AUTOMOTIVE TENSIONER

[75] Inventors: Roger T. Simpson, Ithaca; Kevin B. Todd, Freeville, both of N.Y.

[73] Assignee: Borg-Warner Automotive, Inc., Sterling Heights, Mich.

[21] Appl. No.: 516,919

[22] Filed: Aug. 18, 1995

[51] Int. Cl.$^6$ ........................................................ F16H 7/08
[52] U.S. Cl. ................................................ 474/110; 474/111
[58] Field of Search ............................. 474/101, 110, 474/111, 136, 140

[56] References Cited

U.S. PATENT DOCUMENTS

| | | |
|---|---|---|
| 4,507,103 | 3/1985 | Mittermeier . |
| 4,708,696 | 11/1987 | Kimura et al. . |
| 4,713,043 | 12/1987 | Biedermann . |
| 4,874,352 | 10/1989 | Suzuki . |
| 4,881,927 | 11/1989 | Suzuki . |
| 5,176,581 | 1/1993 | Kumm ................................. 474/110 |
| 5,259,820 | 11/1993 | Mott . |
| 5,277,664 | 1/1994 | Mott . |
| 5,346,436 | 9/1994 | Hunter et al. . |
| 5,577,970 | 11/1996 | Smith et al. ........................ 474/110 |
| 5,628,701 | 5/1997 | Dembosky et al. .............. 474/110 X |

*Primary Examiner*—Roger J. Schoeppel
*Attorney, Agent, or Firm*—Hugh A. Abrams, Esq.; Greg Dziegielewski

[57] ABSTRACT

A hydraulic tensioner is provided with a plunger slidably fitted in a cavity in the tensioner housing and biased in a protruding direction by a spring and fluid. An integral inlet check and pressure relief valve is positioned in the cavity and permits fluid to only flow into the cavity and thereby protrude the plunger but not out of the cavity until a high pressure condition is reached whereupon fluid is relieved out of the cavity back to the fluid source. The integral inlet check and pressure relief valve includes a check spring biasing a valve member a against a pressure relief disk that is biased against the valve member by a pressure relief spring.

20 Claims, 4 Drawing Sheets

INTEGRAL INLET AND PRESSURE RELIEF VALVE FOR AN AUTOMOTIVE TENSIONER

FIELD OF THE INVENTION

This invention relates to hydraulic tensioners, and particularly to a hydraulic tensioner having an extending plunger which is useful for constantly imparting and maintaining tension to wrapped power transmission devices such as chains, belts and the like. The invention is more particularly directed to a hydraulic tensioner having a coil spring and fluid actuated plunger in which a pressure relief valve is in communication with the tensioner hydraulic chamber.

BACKGROUND OF THE INVENTION

Tensioning devices, such as hydraulic tensioners, are used as a control device for a power transmission chain, or any similar power transmission devices, as the chain travels between a plurality of sprockets. Generally, it is important to impart and maintain a certain degree of tension to the chain to prevent noises, slippage, or the unmeshing of teeth in cases of a toothed chain. Prevention of such slippage is especially important in the case of a chain driven camshaft in an internal combustion engine because jumping of teeth will throw off the camshaft timing by several degrees, possibly rendering the engine inoperative or causing damage. However, in the harsh environment in which an internal combustion engine operates, chain tension can vary between excessively high or low levels as a result of the wide variations in temperature and differences between the coefficients of linear expansion among the various parts of the engine, including the chain and the tensioner. Moreover, wear to the chain components, during prolonged use, can result in a decrease in the tension of the chain. It is also necessary to provide some measures to remove excessive tensioning forces on the tight side of the chain and to insure the necessary tension forces on the slack side of the chain. In addition, camshaft and crankshaft induced torsional vibrations cause chain tension to vary considerably. This tension variation results in chain elongation.

One example of a device used to control tension in a wrapped power transmission device is described in Biedermann, U.S. Pat. No. 4,713,043. Biedermann discloses a hydraulic ball-type check valve tensioner having a plunger slidably fitted into a chamber and biased by a spring in a protruding direction. The plunger extends against a lever arm that imparts tension to a chain according to the degree of slackening of the chain. A clearance, which is formed between the ball and seat of a check valve, permits the free flow of fluid therethrough into the chamber. Therefore, the hydraulic pressure from an external source, such as an oil pump or the like, flows into the chamber through passages formed in the housing, advancing the plunger easily by the combined efforts of the hydraulic pressure and the spring force.

On the other hand, when the plunger tends to move in a reverse direction, the ball is tightly contacted with the ball seat to restrict outflow of fluid from the chamber. Only a small clearance between the plunger and the housing wall permits some fluid to escape thereby allowing the plunger to retract. In such a fashion, the tensioner achieves a so-called no-return function, i.e., movements are easy in one direction but difficult in the reverse direction.

However, this no-return function may present difficulties in accommodating tension spikes or surges in the chain, belt or similar wrapped power transmission devices. When a timing device operates at its resonant frequency, the chain load increases significantly. The small clearance between the plunger and the housing wall is not sufficient to quickly release the hydraulic fluid in the chamber to accommodate the sudden overload of the chain.

One example of an attempt to alleviate this problem in a hydraulic tensioner is described in Suzuki, U.S. Pat. No. 4,881,927. Suzuki discloses a hydraulic ball-type check valve tensioner having a plunger slidably fitted into a chamber and biased by a spring in a protruding direction. This tensioner includes a relief valve having a sleeve slidably fitted in an auxiliary chamber in communication with the first chamber, with a spring biasing the sleeve into a depressed position to block a discharge port. Oil in the first chamber flows into the auxiliary chamber to force the sleeve against the biasing spring action to unblock the discharge port.

Unfortunately, this relief valve may be slow to open and close due to high mass and subject to variable friction between the sleeve and auxiliary chamber wall. This may vary the pressure at which the relief valve operates. As well, because the flow area is proportional to the pressure in the chamber, extreme pressure spikes may cause too much fluid to flow out of the chamber resulting in too little pressure in the chamber to maintain proper chain tension after the external cause of the pressure spike recovers.

Another example of an attempt to provide a hydraulic tensioner with a relief valve is described in Mittermeier, U.S. Pat. No. 4,507,103. Mittermeier discloses a hydraulic ball-type check valve tensioner having a plunger slidably fitted into a chamber and biased by a spring in a protruding direction. This tensioner includes a relief valve in a bore at the protruding end of the plunger. This relief valve is a spring-biased ball type valve with the spring set against a threaded throttle plug capping the bore. Oil in the first chamber forces open the ball, upon reaching a set high pressure, and flows into the bore, past the throttle plug threads to the atmosphere. Unfortunately, this relief valve may be slow to release large displacements of oil because of the restricted path past the threads and resultant back-pressure build up against the ball.

Accordingly, it is an object of the present invention to provide a tensioner for chain, belt or similar wrapped power transmission devices which can maintain a substantially constant tensioning force.

It is also an object of the present invention to provide a hydraulic tensioner with a pressure relief valve to allow the plunger to return when excessive loads are seen by the chain.

It is yet another object of the present invention to provide a hydraulic tensioner with a pressure relief valve that reduces the area available for relieving flow when a certain overpressure condition is reached to avoid draining too much fluid from the plunger fluid chamber and collapsing the plunger.

It is also a further object of the present invention to provide a hydraulic tensioner with a pressure relief valve that has a high spring rate and low mass to give a high frequency response.

Further objects and advantages of the present invention will be understood from the detailed description that follows.

SUMMARY OF THE INVENTION

The present invention is directed to a hydraulic chain tensioner having a pressure relief valve. According to one aspect of the present invention, there is provided a tensioner for a wrapped power transmission device, e.g. a chain linking at least two rotating members such as a pair of sprockets. A plunger, internally provided with a fluid chamber, slidably fits within a mounting cavity in a housing. A spring is provided to bias the plunger in a protruding direction towards the chain.

An integral inlet check and pressure relief valve is provided between the housing inlet and the fluid chamber to permit fluid to flow into the fluid chamber of the plunger, while, under certain conditions, blocking flow in the opposite direction. When a load is applied to the plunger by an increasing tension on the chain, the fluid pressure in the chamber increases causing the inlet check valve to close. When the fluid pressure increases further the pressure relief valve opens and permits flow out of the chamber and into the source of hydraulic fluid at the housing inlet. Preferably, as the pressure in the chamber increases further, the relief valve partially closes to restrict the area available for fluid to flow out of the chamber. By restricting the flow area, the pressure relieving capability does not overreact to extreme pressure spikes of a very short duration.

In another embodiment, the integral inlet check and pressure relief valve includes a seat ring that is fixed relative to the tensioner housing. A valve member, such as a ball, is provided that fits against the seat ring. An inlet check spring biases the ball towards the seat ring. A pressure relief disk is provided on the side of the seat ring opposite from the ball. A pressure relief spring biases the relief disk towards the seat ring. The relief disk has an orifice that is aligned with the seat ring, and the relief disk orifice has a diameter smaller than the seat ring inside diameter. A lip at the edge of the relief disk orifice extends up into the seat ring far enough to contact the ball and hold it away from the seat ring under normal operating conditions.

In operation, as the pressure in the fluid chamber decreases, the source of pressurized fluid will push the ball away from the relief disk lips and flow into the fluid chamber. As the fluid demand has been provided for, the check spring will bias the ball against the lips, thereby preventing any fluid flow out of the chamber through the inlet. As the pressure in the fluid chamber increases to a higher predetermined level, the pressure will force the pressure relief disk to move away from the seat ring, thereby providing some area for fluid pressure to be relieved by fluid flowing past the ball and seat ring and around the relief disk back to the source of pressurized fluid. As the pressure increases even further, the ball and relief disk are forced down until the ball seats against the seat ring, thereby reducing the area of flow available to relieve the pressure.

Preferably, the seat ring has holes around its perimeter to allow the flow of some small amount of fluid under these extreme high pressure conditions when the ball seals against the seat ring. In this preferred embodiment the integral inlet check and pressure relief valve advantageously allows some relief of pressure at very high pressure conditions but not so much as to cause the fluid pressure to greatly leak out, thereby avoiding a collapse of the plunger back into the chamber.

DETAILED DESCRIPTION OF THE PREFERRED EMBODIMENTS

Figure 1:
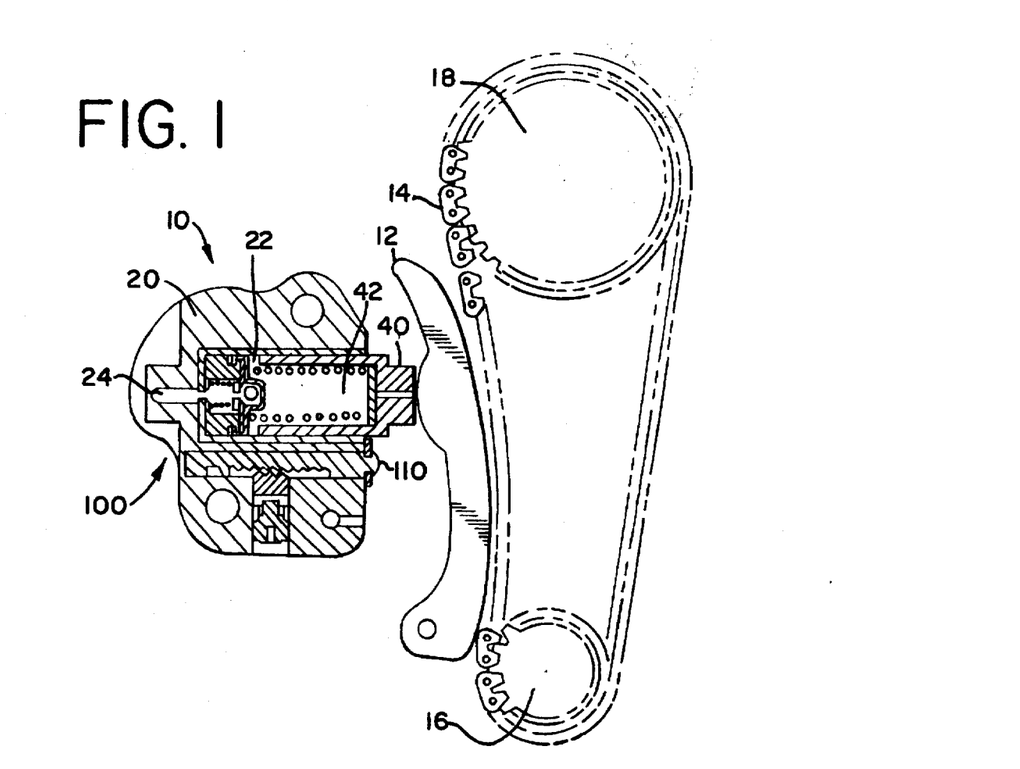
FIG. 1 is an elevation view of a hydraulic tensioner with one embodiment of the integral inlet check and pressure relief valve shown in a cross-sectional view. The tensioner is depicted next to a wrapped power transmission device.

Turning now to the drawings, FIG. 1 illustrates a preferred embodiment of the hydraulic tensioner incorporating the integral inlet check and pressure relief valve 100 of the present invention, as depicted next to a tensioner arm 12 applying tension to a chain 14, such as from an overhead cam timing drive. A typical overhead cam timing drive consists of a crank sprocket 16, a cam sprocket 18, a chain 14, a hydraulic tensioner 10, a tensioner arm 12 and a chain guide (not shown) opposite the tensioner arm. The chain guide is typically located on the "tight strand", or driving side, of the chain. The tensioner arm 12 and tensioner 10 are then located on the "slack strand" of the chain. The tensioner 10 includes a housing 20 with a chamber 22, or a piston bore, an integral inlet check and pressure relief valve 100 in communication with the chamber and the inlet 24, and a plunger 40, or piston, protruding from the housing to push a pivoting tensioner arm 12 against the chain 14 to take up slack and keep the chain at some minimum tension value for good chain control.

Figure 2:
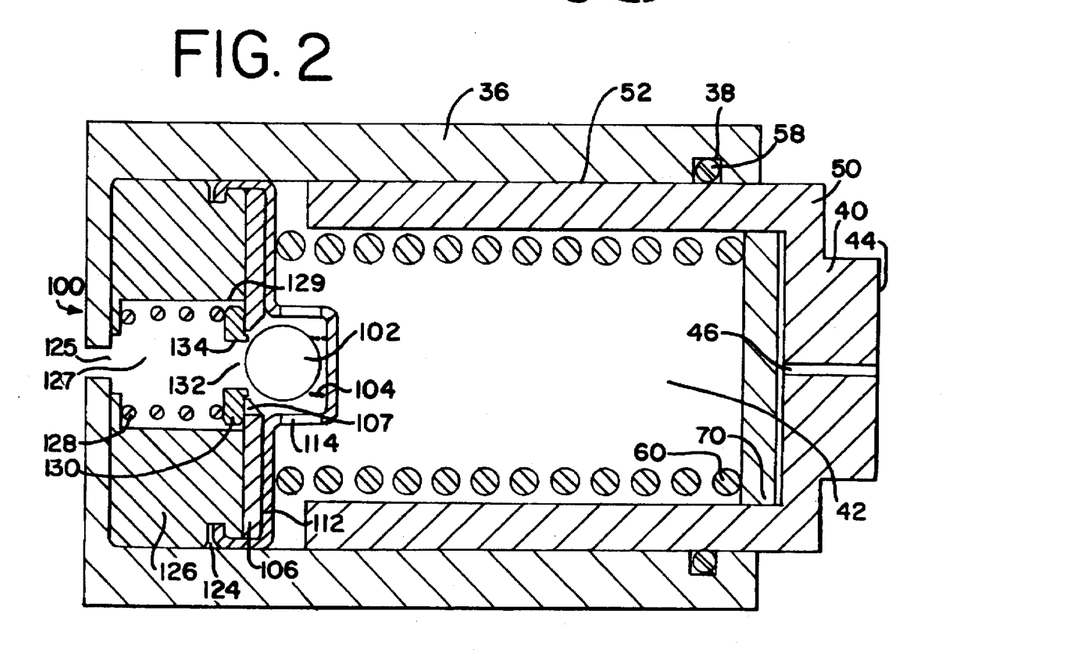
FIG. 2 is a cross-sectional view of the tensioner of FIG. 1 showing the internal components of the tensioner under operating conditions.
Figure 9:
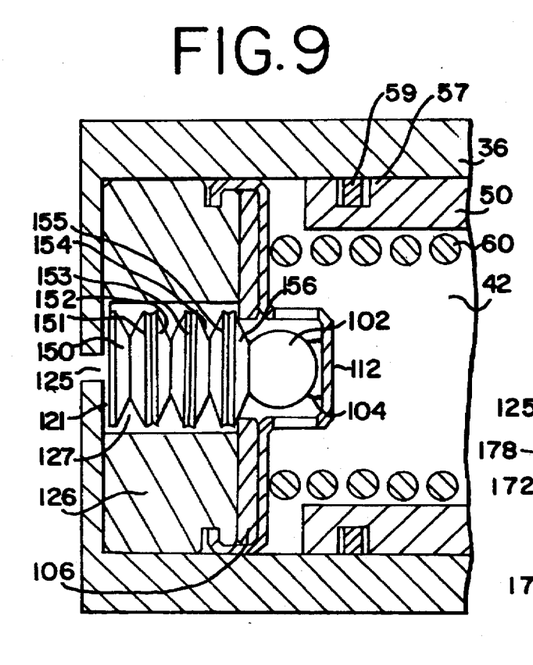
FIG. 9 depicts further another embodiment of an integral inlet check and pressure relief valve as shown in detail in a cross-sectional view.

Referring now to FIG. 2, the plunger and integral inlet check and pressure relief valve assembly are shown. The plunger 40 and the integral inlet check and pressure relief valve 100 are located within an assembly sleeve 36. The valve 100 is located at the fluid inlet 125 of the sleeve 36. The plunger 40 is placed around a spring 60 that is provided against the valve 100. The spring 60 biases the plunger out from and away from the assembly sleeve 36 so that the plunger tip 44 pushes against a tensioner arm 12 as shown in FIG. 1. A vent disk 70 is provided inside the plunger adjacent the tip to allow for venting of trapped air and some fluid to flow out through the vent port 46 at the tip 44 of the plunger. A seal ring groove 38 is provided at the open end of the sleeve 36 for placement of a seal ring 58 therein to provide a seal around the exterior of the plunger 40 to retain the fluid within the fluid chamber 42. Alternatively, the seal ring 58 and groove 38 may be located at the bottom of the plunger as shown in FIG. 9.

As shown in FIG. 2, the integral inlet check and pressure relief valve 100, in this preferred embodiment, includes a valve cage 112, a check spring 104, a valve member 102, such as a ball, a seat ring 106, a pressure relief disk 130, and a pressure relief spring 128. These components may be sandwiched between a pressure relief housing 126 and a check valve cage 112 that clamps onto a groove 124 in the housing.

Figure 8:
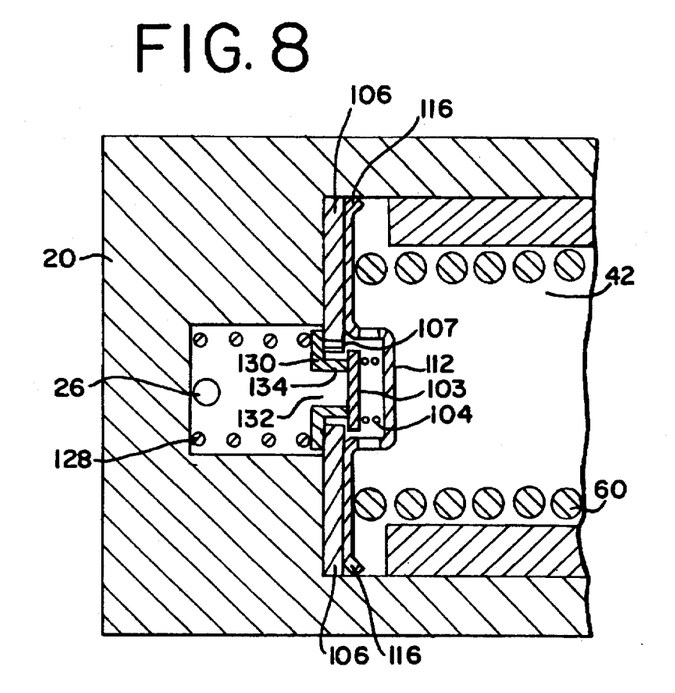
FIG. 8 depicts still another embodiment of an integral inlet check and pressure relief valve as shown in detail in a cross-sectional view.

The valve member 102, shown as a ball in FIG. 2, may have various geometric configurations. For example, the valve member 102 may be a disk 103 as shown in FIG. 8, or a tapered plug (not shown). If a tapered plug is used, the smaller tapered end will be positioned near the relief disk 130 and the larger base end will be adjacent the check spring 104. The exact configuration will, of course, depend on the dynamic response designed for the intended service. For example, a solid metal ball, such as a ball bearing used as a valve member, will have greater mass and thus have a slower response and a lower natural frequency compared to a small light weight disk, or even a hollow metal ball. The valve member may also be constructed from ceramic or engineered plastics, such as polyimide.

Figure 5:
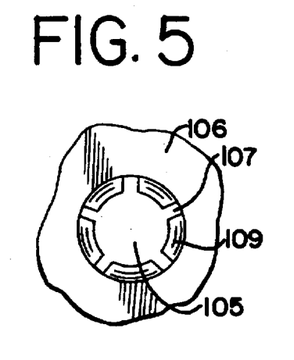
FIG. 5 is a top plan view of the seat ring shown in FIG. 4 as taken across line 5—5.

The seat ring 106, preferably, has a plurality of passages 107 around the perimeter of the seat ring opening 105, as shown in detail in FIG. 5. Typically, four or five passages may be adequate. The number and size of passages 107 will vary depending on the amount of reduced flow area desired under maximum pressure conditions. For example, a nominal relieving flow of 6 ml/min. may be desired with a reduced nominal flow of 2 ml/min. at maximum pressure conditions. As shown in FIGS. 2 and 5 the passages 107 may be cut as slots at the seating surface 109 around the perimeter of the seat ring 106. Alternatively, the passages may be holes (not shown) drilled around the edge of the seating surface 109 so that a complete seating surface is provided for full contact with the valve member 102. The seat ring 106 is positioned against the end of the pressure relief valve housing 126.

Referring again to FIG. 2, within the pressure relief valve housing 126 is an inlet cavity 127 wherein the pressure relief valve spring 128 is placed. This spring contacts the pressure relief disk 130 to bias the relief disk against the bottom of the seat ring 106 under normal operating conditions.

The relief disk 130 has an outside diameter less than the internal diameter of the inlet cavity 127 so that fluid may flow around the outside of the relief disk 130 between the disk and the wall of the relief valve housing 129. The relief disk 130 has an orifice 132 in the center.

At the edge of the orifice 132 is a lip 134 that extends from the relief disk into the opening of the seat ring 106. The lip 134 has a length sufficient to contact the valve member 102 and hold the valve member away from the seat ring 106. The length of the lip, of course, will vary depending on the configuration of the valve member 102. For example when the valve member is a disk, the lip will need to have a longer length so that it may extend all the way through the seat ring orifice to hold the disk up above the seat ring surface.

On the other hand when the valve member is a tapered plug, the lip may not even need to be present at all. The tapered plug may have a tapered shape such that the smaller tapered end will fit in the orifice of the relief disk and yet the larger base of the tapered plug will extend farther back away from the seat ring surface 109 to provide a clearance between the seat ring and the plug. However, the base should be large enough to contact and form a seal at the seat ring when the relief disk moves away from the seat ring.

In addition, when the valve member is a disk, the disk may have passages therethrough at the disk perimeter that align with the clearance between the seat ring 106 and the relief disk lips 134. This embodiment provides similar functionality as the seat ring passages 107, and thus may be an alternative construction.

The check valve spring 104 and the pressure relief spring 128 may be constructed of any spring steel customarily used for such services as well known by one skilled in the art. The check valve spring 104 is typically designed for a cracking pressure of several PSI. The relief valve spring 128, on the other hand, is typically set for a much higher cracking pressure of about 250 PSI.

Figure 6:
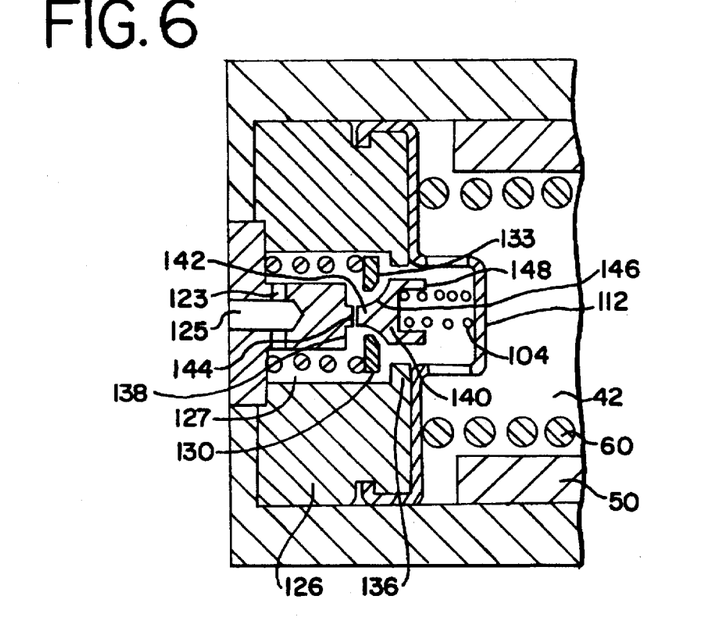
FIG. 6 depicts another embodiment of an integral inlet check and pressure relief valve as shown in detail in a cross-sectional view.

Referring now to FIG. 6, an alternative embodiment of the present invention is shown. In this embodiment, the valve member is shown as a tapered plug 140. The valve plug has spring guides 148 which maintain the valve plug in position relative to the check spring 104. Also, in this embodiment there is no seat ring. Rather, there is provided a valve member stop 144 and a relief disk stop 136. Also, there is provided a relief disk limiter 138. The valve member stop 144 stops the tapered plug 140 at a maximum biased position. The relief disk stop 132 stops the travel of the relief disk 130 at a maximum biased position. The relief disk limiter 138 limits the travel of the relief disk 130 in a direction opposite the relief spring bias. As shown in this embodiment, the valve stop 144 and the relief disk limiter 138 are integrally formed and located in the inlet cavity 127. Inlet ports 125 and 123 are provided through this combined stop/limiter to allow fluid to flow into the inlet cavity 127.

Figure 7:
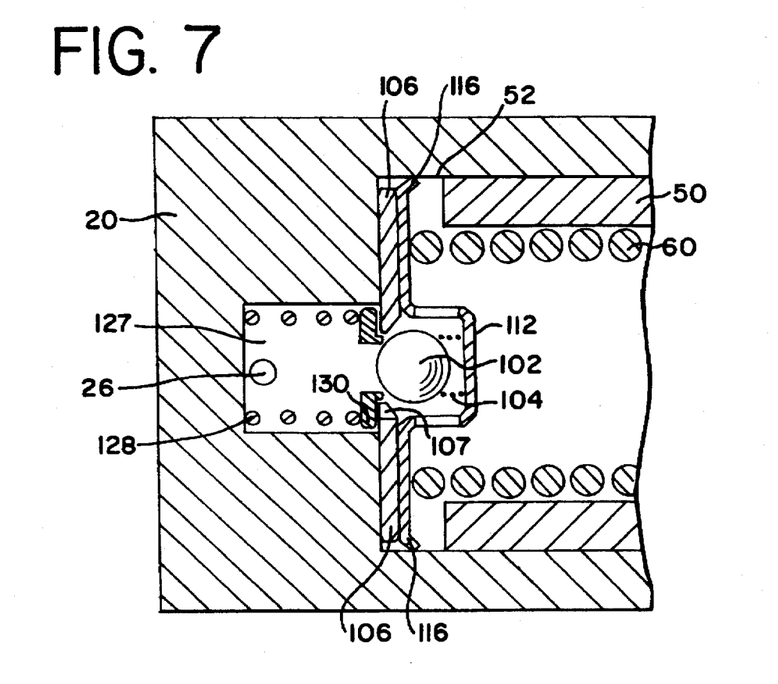
FIG. 7 depicts yet another embodiment of an integral inlet check and pressure relief valve as shown in detail in a cross-sectional view.

Referring now to FIG. 7, another alternative embodiment of the present invention is shown. In this embodiment, the integral inlet check and relief valve 100 is built into the housing 20 of the tensioner. The housing inlet port 26 enters the valve inlet cavity 127 through the side of the housing 20. The valve components, i.e. the relief spring 128, the relief disk 130, the seat ring 106, the ball 102 and the check spring 104 are retained in position by the valve cage 112. The cage 112 has retainer clips 116 around the perimeter that apply a friction against the housing chamber wall 52 to retain the assembly in position.

Referring now to FIG. 8, still another alternative embodiment of the present invention is shown. In this embodiment, the integral inlet check and relief valve 100 is built into the housing 20 of the tensioner. Similar to the embodiment depicted in FIG. 7, this embodiment uses pressure retaining clips 116 around the perimeter of the cage 112 to retain the valve components in position. However, the main difference is that this embodiment takes advantage of a disk 103 as the check valve member. The disk 103 takes up less space than a ball 102 so that a cage 112 with less height may be used. The relief disk 130 has a lip 134 around the perimeter of the relief disk orifice 132. The lip 134 extends through the seat ring 106 to hold the check valve disk 103 away from the seat ring under normal operating conditions, and also at nominal pressure relieving conditions when the over pressure in the chamber 42 causes the relief disk 130 to move away from the seat ring. The check valve disk 103 has a diameter greater than the seat ring orifice diameter such that the disk 103 will seat against the seat ring at extreme over-pressure conditions. The seat ring 106 has a plurality of passages 107 therethrough shown as holes drilled around the seat ring orifice perimeter at a position outside the check valve disk diameter, and inside the relief disk outside diameter.

Referring now to FIG. 9, yet another alternative embodiment is shown. In this embodiment, a seal groove 57 is positioned at the base of the plunger 50. A seal ring 59 is in the seal groove 57 to maintain a tight seal to retain pressured hydraulic fluid within the chamber 42. With this arrangement, a seal ring is not needed in the chamber sleeve 36.

Also, the embodiment in FIG. 9 has a stack of belleville springs 150 through 156 placed in the relief housing 126. A belleville is a disk spring that has a tapered or conical shape with an orifice in the center. A sufficient force applied on the belleville to overcome its inherent spring bias will cause it to deflect to a flatter shape. The bellevilles 150 through 156 are stacked in alternating positions to provide a relief spring bias. The top belleville 156 contacts the seat ring 106 to provide a seal there. The exact number of bellevilles required depends on the spring force required and the size of the relief valve inlet cavity 127. The check valve ball 102 nests in the center opening of the top belleville 156. The ball 102 has a diameter slightly less than the seat ring 106 inside diameter, the seat ring 106 does not have passages. The bottom of the relief housing 126 contacts the bottom of the chamber sleeve 36. Relief housing inlet cut-outs 121 are provided so that pressurized fluid may flow from the inlet port 125 past the bottom belleville 150 into the relief housing inlet cavity 127.

Figure 10:
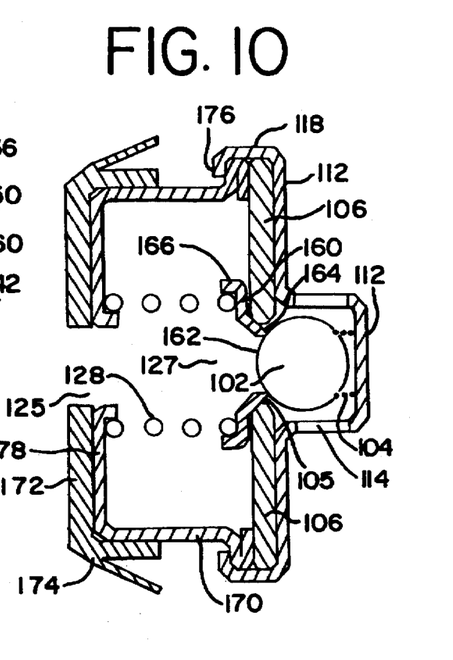
FIG. 10 depicts another embodiment of an integral inlet check and pressure relief valve as shown in detail in a cross-sectional view removed from a tensioner housing.

Referring now to FIG. 10, another alternative embodiment is shown removed from a tensioner housing. This embodiment is well-suited for manufacture from stamped parts. A relief housing cage 170 to provided to support a relief spring 128. The relief spring 128 biases the relief disk 160 against the seat ring 106 and against the check ball 102. The check cage 112 retains the check ball 102 in position and supports a check spring 104 that biases the ball 102 against the relief disk 160.

The relief housing cage 170 has a flange 176 that is positioned against and supports the seat ring 106. The check cage 112 has a shoulder 118 that clasps around the seat ring 106 and onto the flange 176 of the relief housing cage 170 to retain the assembly together.

An oil seal 172 is provided at the base 178 of the relief housing cage 170. The oil seal 172 is typically a flexible material, such as Nylon 6/6, whereas the relief housing cage 170 is stamped from sheet metal, such as low carbon steel. The oil seal 172 has a skirt 174 around its perimeter. When the assembly is positioned in the hydraulic chamber of a tensioner, the skirt 172 presses tightly against the chamber wall to prevent hydraulic fluid from leaking out of the chamber around the valve assembly back to the source of hydraulic fluid.

The relief disk 160 may typically be stamped from sheet metal, or it may be coined to its tapered shape as shown. The relief disk 160 is provided with a shoulder 166 that cups the end of the relief spring 128 to position the relief disk centrally over the relief spring. The tapered shape provides a lip 164 that protrudes up through the seat ring orifice 105 to contact the ball 102 when the pressure in the hydraulic chamber is high enough to apply a back pressure on the ball 102, or the check spring biases the ball, into the relief disk orifice 162 and against the lip 164 of the relief disk. Although the relief disk 160 may be stamped from low carbon steel sheet metal, having for example 0.02 inch thickness, the relief disk should be hardened, such as by heat treatment. The hardening of the relief disk minimizes the wear from the ball 102 hitting against it as the check valve opens and closes.

As shown in FIG. 1, embodiments of this invention are ideal for being used in conventional tensioner housings that do not have a separate pressure relief valve. For example, the entire assembly as shown in FIG. 2 may be inserted within the piston bore 22 of a tensioner housing such as shown and described in U.S. Pat. No. 5,259,820 and U.S. Pat. No. 5,277,664, both of which are owned by the assignee of the present application and both of which are incorporated herein by reference.

Likewise, this invention may be incorporated with a tensioner that includes a rack and rachet assembly as shown in FIG. 1 to provide a mechanical no return limiter function. The rack 110 is associated with the plunger 40 so that as the plunger moves outward, the rack also moves upward. Alternative embodiments in the operation of this rack and rachet assembly are described in U.S. Pat. No. 5,346,436 which is owned by the assignee of the present application and is incorporated herein by reference.

Figure 3:
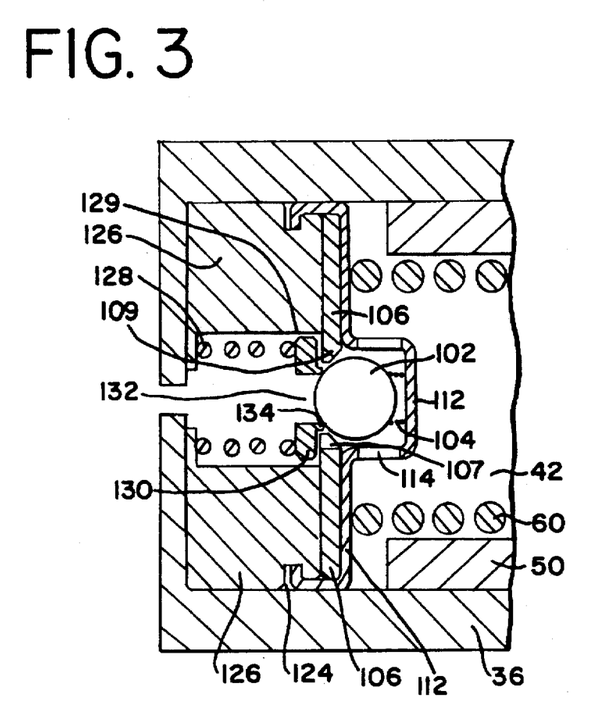
FIG. 3 shows in detail a cross-sectional view of the integral inlet check and pressure relief valve of FIG. 2 under pressure relieving conditions.
Figure 4:
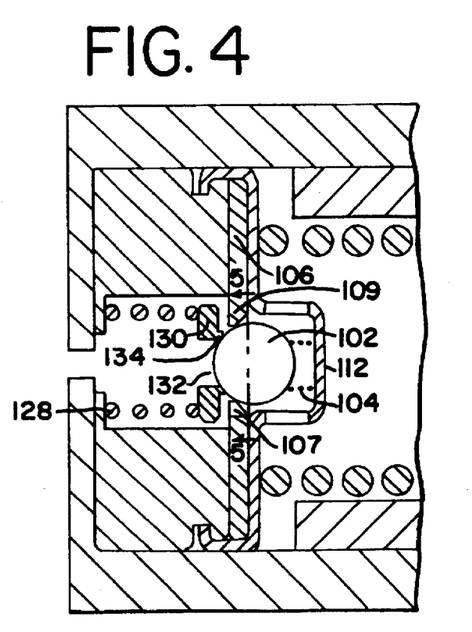
FIG. 4 shows in detail a cross-sectional view of the integral inlet check and pressure relief valve of FIG. 2 under relieving conditions at maximum pressure.

The operation of this invention may be understood by considering the series of FIGS. 2 through 4 in sequence. First, FIG. 2 shows the integral inlet check and pressure relief valve 100 under normal operating conditions. As the spring 60 forces the plunger 40 out from the assembly sleeve 36 and against the chain, a hydraulic fluid demand is created that draws fluid into the fluid chamber. As can be seen, the ball 102 is pushed up against the top of the cage 112 by fluid pressure from the source of pressurized fluid at the inlet 125. The fluid flows into the inlet cavity 127 and pushes against the bottom of the ball 102 forcing it up and away from the relief disk lips 134. This provides an area for fluid to flow past the ball and out through the cage ports 114 and into the fluid chamber 42. However, when the fluid demand in the fluid chamber has been met, the small bias on the check spring 104 biases the check ball 102 against the lips 134 to seal off flow into the fluid chamber.

When tension from the chain 14 increases and forces the tensioner arm 12 downward against the plunger 40, as may be seen in FIG. 1, the fluid pressure in the fluid chamber 42 correspondingly increases. This increased pressure against the ball 102 maintains the ball in a tight seal against the relief disk lip 134. This seal prevents fluid flow back through the inlet.

As the pressure in the fluid chamber builds up to a high enough predetermined level to overcome the relief spring 128 bias, the pressure acting on the ball 102 and the portion of the relief disk 130 exposed to the high fluid pressure in the fluid chamber will cause the ball and the disk to move against the relief spring bias. Thus, as shown in FIG. 3, the relief disk 30 will be pushed away from the seat ring 106 providing a conduit for passage of fluid between the ball 102 and seat ring surface 109 and between the seat ring 106 and the relief disk 130. The fluid will flow into the source of fluidized pressure in communication with the inlet 24 to the tensioner thereby relieving pressure in the fluid chamber 42. Under these conditions the fluid will flow between the seat ring and the ball, and also through the passages 107 around the perimeter of the seat ring.

Now, under a predetermined maximum pressure condition the pressure in the fluid chamber against the ball 102 forces the ball against the seat ring surface 109, thereby blocking the flow of fluid between the ball and the seat ring surface. However, because the passages 107 are provided in the seat ring perimeter, there still is a small area available for fluid to flow, thereby allowing a reduced amount of flow out of the fluid chamber and into the reservoir as shown in FIG. 4. The relative area of the passages and the area between the ball and the seat ring may be selected depending on the required relieving flow to achieve desired characteristics of the tensioner. For example, it may be desired to have a typical relieving flow of about 6 ml/min. reduced to about 2 ml/min. under maximum pressure conditions.

Typically, the pressure pulses seen by a tensioner are on the order of 3,000 to 4,000 Hz. Therefore, by reducing the area available for pressure relief the tensioner is prevented from over relieving fluid when such short lived pressure spikes are seen. Because the ability of fluid to flow back into the fluid chamber may be slow, by restricting the pressure relief area the plunger may be prevented from collapsing back into the assembly sleeve. The oil flow is reduced enough to stop the plunger from collapsing but not too much to allow the pressure to build up in the fluid chamber to an unacceptable level.

Referring now to the alternative embodiment shown in FIG. 6, under normal operating conditions, this embodiment functions similarly to the embodiment heretofore described. Under pressure relieving conditions this embodiment functions as follows. High pressure in the fluid chamber forces the valve plug 146 and the relief disk 130 to move away in tandem from the relief disk stop 136 because the pressure force has exceeded the relief spring bias. Fluid is allowed to flow past the valve plug 146 and around the outside of the relief disk 130 back into the inlet cavity 127.

As pressure increases further the valve plug tapered end 142 hits the valve stop 144. The pressure continues acting on the relief disk 130 to force the relief disk down and away from the valve plug 140, thereby providing a clearance for fluid to flow between the relief disk seating surface 133 and the valve plug tapered base 146. Thus at high pressure conditions, the flow area available to relieve the pressure may be both around the outside of the relief disk and through the orifice of the relief disk between the relief disk and the valve plug.

As the fluid pressure in the fluid chamber reaches a maximum predetermined amount, the pressure would have forced the relief disk against the relief disk limiter 138. The relief disk 130 forms a seal against the relief disk limiter 138, thereby blocking flow through the orifice of the relief disk. Thus the remaining area available for transfer of fluid has been greatly reduced to only the area around the outside of the relief disk. This area may be easily determined by designing a desired clearance between the relief disk and the relief housing inlet cavity wall.

The alternative embodiments depicted in FIGS. 7 and 8 function similarly to the operation described for FIGS. 2 through 4. In the case of the embodiment depicted in FIG. 8, a disk 103 as the check valve member is less mass than a ball and would correspondingly have a higher frequency response. This may result in a better dynamic match for automotive engine systems that normally operate at higher r.p.m.'s which place correspondingly faster load changes on timing chains to which the hydraulic tensioner of this embodiment may be well suited.

The alternative embodiment depicted in FIG. 9 also functions similarly to the operation described for FIGS. 2 through 4. However, a description of the belleville spring operation will aid in the understanding of this embodiment. Under normal operating pressure conditions, the spring force of the bellevilles forces the top belleville 156 against the seat ring 106. The ball 102 nests in the opening of the top belleville 156. When the plunger 50 extends outward, the lower pressure in the chamber 42 permits the higher pressure from the source of hydraulic fluid to overcome the check valve spring bias and push the ball 102 away from the top belleville 156. Fluid then flows from the inlet port 125 through the interior of the stack of bellevilles and out past the ball 102 and then into the chamber 42. When the fluid demand is satisfied, the check spring 104 forces the ball 102 against the top belleville to close the valve and stop fluid flow.

As the pressure in the chamber 42 exceeds a predetermined level, the back pressure against the belleville 156 will overcome the belleville stack spring bias and force the stack to compress. Thus, the belleville 156 and ball 102 move in tandem toward the inlet port 125. This movement of the top belleville 156 away from the seat ring 106 creates a clearance for fluid from the chamber 42 to flow back to the source of pressurized fluid, thus relieving the over-pressure conditions.

In this embodiment shown in FIG. 9, there is a clearance between the ball diameter and the seat ring opening. In operation, when the pressure in the chamber 42 continues to build up beyond typical over pressure conditions, the ball 102 and bellevilles move in tandem against the increasing back pressure. As the pressure increases, the ball 102 moves down into the seat ring with the effect that the increasing cross-section of the ball coming adjacent the seat ring 106 decreases proportionately the area available for relieving pressure at this super over-pressure condition. This reduced area provides the same protection to avoid relieving too much fluid from the chamber 42 as described in the operation of the other embodiments. The exact reduction in area may be readily designed by one skilled in the art by considering the belleville movement, the belleville spring force, the seat ring orifice diameter and the ball diameter selected.

Alternatively, a seat ring may be selected with an orifice diameter less than the ball diameter. In this situation, the seat ring would require passages therethrough to provide the reduced flow area needed for some relieving capability under super over-pressure conditions when the ball would seat against the seat ring as shown in FIG. 4.

The alternative embodiment depicted in FIG. 10 functions substantially as described for the operation of FIGS. 2 through 4. Here in FIG. 10, the valve is shown in a closed position. The pressure in the fluid chamber is high enough so that the back pressure on the ball combined with the check spring bias forces the ball 102 against the relief disk lip 164. The pressure is yet too low to force the relief disk 160 away from the seat ring 106.

Some of the advantages of using an integral inlet check and pressure relief valve are that it has a high spring rate and low mass which gives the relief valve a high frequency response. Another advantage is that the dynamic characteristics can be easily changed by altering the design of the individual components, as heretofore described, to achieve the selected response for the needed application. Another advantage is that this invention provides a relief valve with a multi-variable flow area so that upon higher relieving pressures the flow area is reduced contrary to conventional relief valves. This advantageously prevents the over relieving of hydraulic fluid from the fluid chamber such that the tensioner may maintain a minimum tension on the chain and achieve good chain control, while at the same time allowing some small flow to relieve the pressure and avoid unacceptable high levels. Yet another advantage is that this invention may be easily manufactured as a replacement kit to be used in a conventional hydraulic tensioner housing to provide an additional pressure relief capability not previously incorporated therein.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments modifications of structure, sequence, materials and the like would be apparent to those skilled in the art, yet still fall within the scope of invention.

What is claimed is:

1. A hydraulic tensioner for a wrapped power transmission device between two rotating members, comprising:

a housing with a fluid chamber, said chamber communicating with an external source of pressurized fluid;

a plunger positioned within said chamber and capable of extending therefrom for bearing against a power transmission device to regulate tension between said rotating members;

a spring member biasing said plunger in a direction extending from said chamber; and an integral inlet check and pressure relief valve positioned to allow the transfer of pressurized fluid from said source of pressurized fluid to said chamber and to block the transfer of fluid from said chamber to said source of pressurized fluid at a first predetermined pressure condition in said chamber, but permit transfer of fluid from said chamber to said source of pressurized fluid at a second higher predetermined pressure condition in said chamber, said integral inlet check and pressure relief valve including an inlet check valve seat ring having a first side, a second side and an orifice, said seat ring fixed relative to said housing, a valve member disposed proximate to said first side of said seat ring, an inlet check spring biasing said valve member toward said seat ring first side, a pressure relief disk having an orifice, said relief disk disposed proximate to said second side of said seat ring opposite said valve member, and a pressure relief spring biasing said pressure relief disk toward said seat ring second side.

2. The tensioner of claim 1 wherein said relief disk orifice has a first diameter, said seat ring orifice has a second diameter, said first diameter is smaller than said second diameter, and the relief disk orifice is aligned with the seat ring orifice.

3. The tensioner of claim 2 wherein said valve member has a generally tapered shape with a tapered end and a base, said tapered end disposed proximate to said relief disk and said base adjacent to said check spring.

4. The tensioner of claim 2 wherein said valve member is a ball.

5. The tensioner of claim 2 wherein said pressure relief disk includes a lip around the perimeter of the orifice depending from the relief disk, said lip protruding into the orifice of said seat ring a sufficient length such that at said first predetermined pressure condition said valve member contacts and forms a seal against the lip thereby blocking transfer of fluid through the relief disk orifice, and at said second pressure condition the high pressure condition in said fluid chamber applies additional bias on said valve member so that the valve member forces the relief disk away from the seat ring thereby permitting transfer of fluid between the seat ring and the relief disk.

6. The tensioner of claim 5 wherein said seat ring includes a plurality of pressure relief passages spaced apart around the orifice of said seat ring, said passages are in communication with said source of pressurized fluid and said fluid chamber, such that, at pressure conditions less than said second pressure condition, the relief disk is biased against the seat ring thereby blocking transfer of fluid through the passages, at pressure conditions more than said second pressure condition, the pressure in the fluid chamber applies a force on the relief disk so as to move the relief disk away from the seat ring thereby allowing transfer of fluid through the passages and the seat ring orifice, and at a third predetermined pressure condition, wherein the pressure in the fluid chamber is higher than at said second condition, the higher pressure applies additional bias on said valve member so that the valve member contacts and forms a seal against the seat ring thereby blocking transfer of fluid through the orifice but permitting transfer of fluid through the passages.

7. The tensioner of claim 5 wherein said valve member is a disk.

8. The tensioner of claim 7 wherein said valve member disk has a plurality of passages therethrough at the perimeter of the disk, said passages being aligned between said lip and said seat ring to provide a reduced area for transfer of fluid when the valve member disk contacts the seat ring.

9. A hydraulic chain tensioner comprising:

a housing having a fluid chamber;

a plunger slidably received within the fluid chamber;

a spring biasing the plunger in a first direction extending from the fluid chamber; and an integral inlet check and pressure relief valve disposed in the fluid chamber including an inlet check valve member, a check spring biasing said valve member in a second direction, said second direction opposite of said first direction, a pressure relief disk disposed proximate to said valve member, and a pressure relief spring biasing said relief disk in the first direction toward said valve member.

10. The tensioner of claim 9 wherein said integral inlet check and pressure relief valve further comprises an inlet check valve seat ring at a fixed position between said valve member and said relief disk, wherein the valve member at a maximum biased position seats against a first side of the seat ring and holds the relief disk away from the seat ring, and the pressure relief disk at a maximum biased position contacts a second side of the seat ring and holds the valve member away from the seat ring.

11. The tensioner of claim 10 wherein said pressure relief disk has an orifice and a lip depending from the disk at the perimeter of the orifice, said lip extends toward said valve member, the lip having a length sufficient to contact said valve member when the valve member is at less than maximum biased position such that upon further movement toward maximum biased position the valve member forces the relief disk away from the seat ring.

12. The tensioner of claim 11 wherein said seat ring has a plurality of pressure relief passages in communication with said fluid chamber, said pressure relief passages positioned such that said pressure relief disk blocks said passages when the relief disk is at full biased position, and at a first predetermined high pressure condition in said fluid chamber, the fluid therein applies a pressure on the portion of pressure relief disk blocking the passages and on said valve member contacting the pressure relief disk, said pressure sufficient to overcome pressure relief spring bias thereby causing said pressure relief disk to move away from the seat ring permitting transfer of fluid through the passages and between the valve member and the seat ring, and at a second predetermined pressure condition the valve member moves to maximum biased position and forms a seal against the seat ring and permits transfer of fluid through the passages.

13. The chain tensioner of claim 9 wherein said integral inlet check and pressure relief valve further comprises:

a valve member stop and a pressure relief disk stop, wherein said valve member stop is positioned to maintain a maximum biased position of the valve member and the pressure relief disk stop is positioned to maintain a maximum biased position of the relief disk; and a pressure relief disk limiter positioned to limit the movement of the relief disk in a direction against the pressure relief spring bias.

14. The chain tensioner of claim 13 wherein:

said relief disk has an orifice;

said valve member has a generally tapered shape with a tapered end and a base, the tapered end extends through said relief disk orifice and is disposed adjacent to said valve member stop, and the base has a cross-section larger than the relief disk orifice; and said relief disk limiter forms a seal against the perimeter of the orifice of the relief disk when the relief disk contacts the limiter.

15. The chain tensioner of claim 14 wherein said relief disk limiter and said valve member stop are integrally formed.

16. The chain tensioner of claim 9 wherein said pressure relief spring comprises a plurality of bellevilles stacked in an alternating orientation to provide a spring force thereby.

17. The chain tension of claim 16 wherein said integral inlet check and pressure relief valve further comprises a seat ring at a fixed position between said valve member and said relief disk, wherein the relief disk at a maximum biased position contacts the seat ring.

18. The chain tensioner of claim 17 wherein said pressure relief disk comprises a belleville of the end of said stack of bellevilles such that the relief spring bias forces the relief disk belleville against said seat ring.

19. The chain tensioner of claim 18 wherein said valve member comprises a ball that seats against said relief disk belleville orifice.

20. The chain tensioner of claim 19 wherein said seat ring has an orifice of a diameter greater than a diameter of said ball.

* * * * *